(12) United States Patent
Adachi

(10) Patent No.: US 8,223,266 B2
(45) Date of Patent: Jul. 17, 2012

(54) DISPLAY AND TELEVISION APPARATUS

(75) Inventor: Takafumi Adachi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1236 days.

(21) Appl. No.: 11/965,176

(22) Filed: Dec. 27, 2007

(65) Prior Publication Data
US 2008/0158421 A1    Jul. 3, 2008

(30) Foreign Application Priority Data

Dec. 28, 2006  (JP) .................... 2006-354631

(51) Int. Cl.
*H04N 3/27* (2006.01)

(52) U.S. Cl. ........................ 348/554; 348/555

(58) Field of Classification Search ............. 348/554, 348/555
See application file for complete search history.

(56) References Cited

U.S. PATENT DOCUMENTS

| 6,963,623 | B2 | 11/2005 | Ninomiya et al. |
| 7,123,310 | B2 | 10/2006 | Onomatsu |
| 2006/0236355 | A1* | 10/2006 | Kim et al. ............ 725/100 |
| 2007/0192811 | A1 | 8/2007 | Nebashi et al. |

FOREIGN PATENT DOCUMENTS

| JP | 3540242 B2 | 4/2004 |
| JP | 3589178 B2 | 8/2004 |
| JP | 2006-5785 A | 1/2006 |
| JP | 2006-222766 A | 8/2006 |
| JP | 2007-201588 A | 8/2007 |
| JP | 2007-221460 A | 8/2007 |

OTHER PUBLICATIONS

Japanese Office Action dated Nov. 11, 2008 with English translation (Six (6) pages).

* cited by examiner

*Primary Examiner* — Hunter B Lonsberry
(74) *Attorney, Agent, or Firm* — Crowell & Moring LLP

(57) ABSTRACT

A display includes a mode switching portion capable of switching between mixed mode performing both processing of the analog broadcasting and processing of the digital broadcasting and digital mode preferentially performing the processing of the digital broadcasting and a control portion controlling the mode switching portion so as to switch the mixed mode to the digital mode when the analog broadcasting is terminated.

15 Claims, 6 Drawing Sheets

FIG.4

COMPARISON BETWEEN MIXED MODE AND DIGITAL MODE

|  | MIXED MODE | DIGITAL MODE |
|---|---|---|
| AUTO SCAN (AT INITIAL SETTING) | BOTH OF ANALOG BROADCASTING AND DIGITAL BROADCASTING ARE DETECTED | ONLY DIGITAL BROADCASTING IS DETECTED |
| SETUP SCREEN | ITEMS FOR ANALOG BROADCASTING ARE PREFERENTIALLY-DISPLAYED | ITEMS FOR DIGITAL BROADCASTING ARE PREFERENTIALLY-DISPLAYED |
| DIRECT SELECTION | ANALOG BROADCASTING IS PREFERENTIALLY-SELECTED | ONLY DIGITAL BROADCASTING IS SELECTED |
| CHANNEL LIST SELECTION | BOTH OF ANALOG BROADCASTING AND DIGITAL BROADCASTING ARE SELECTED | ONLY DIGITAL BROADCASTING IS SELECTED |

FIG.5

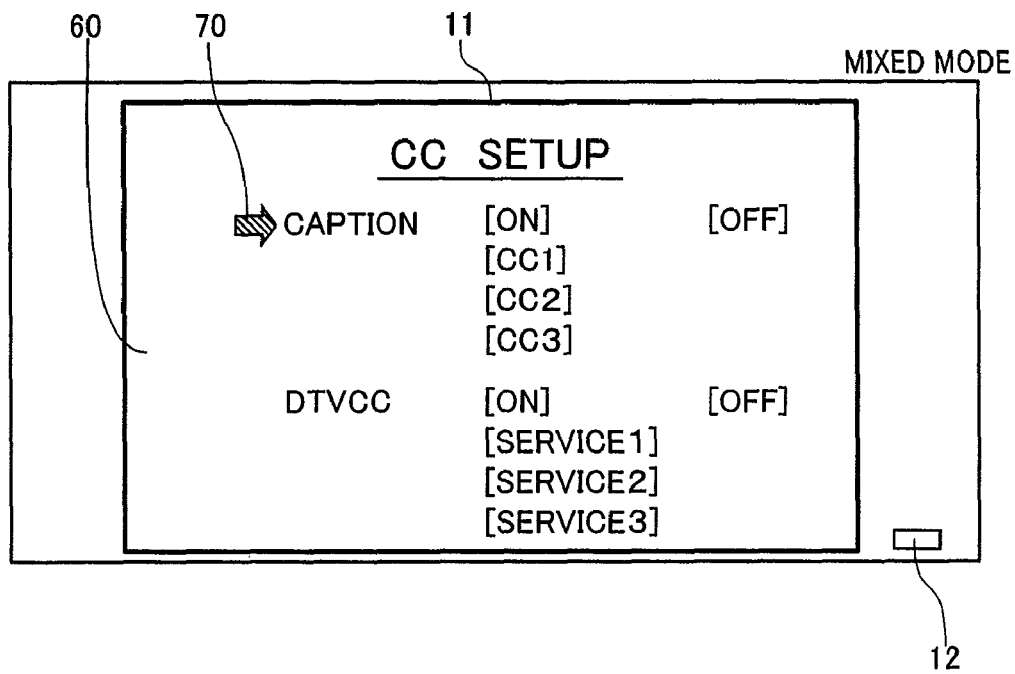

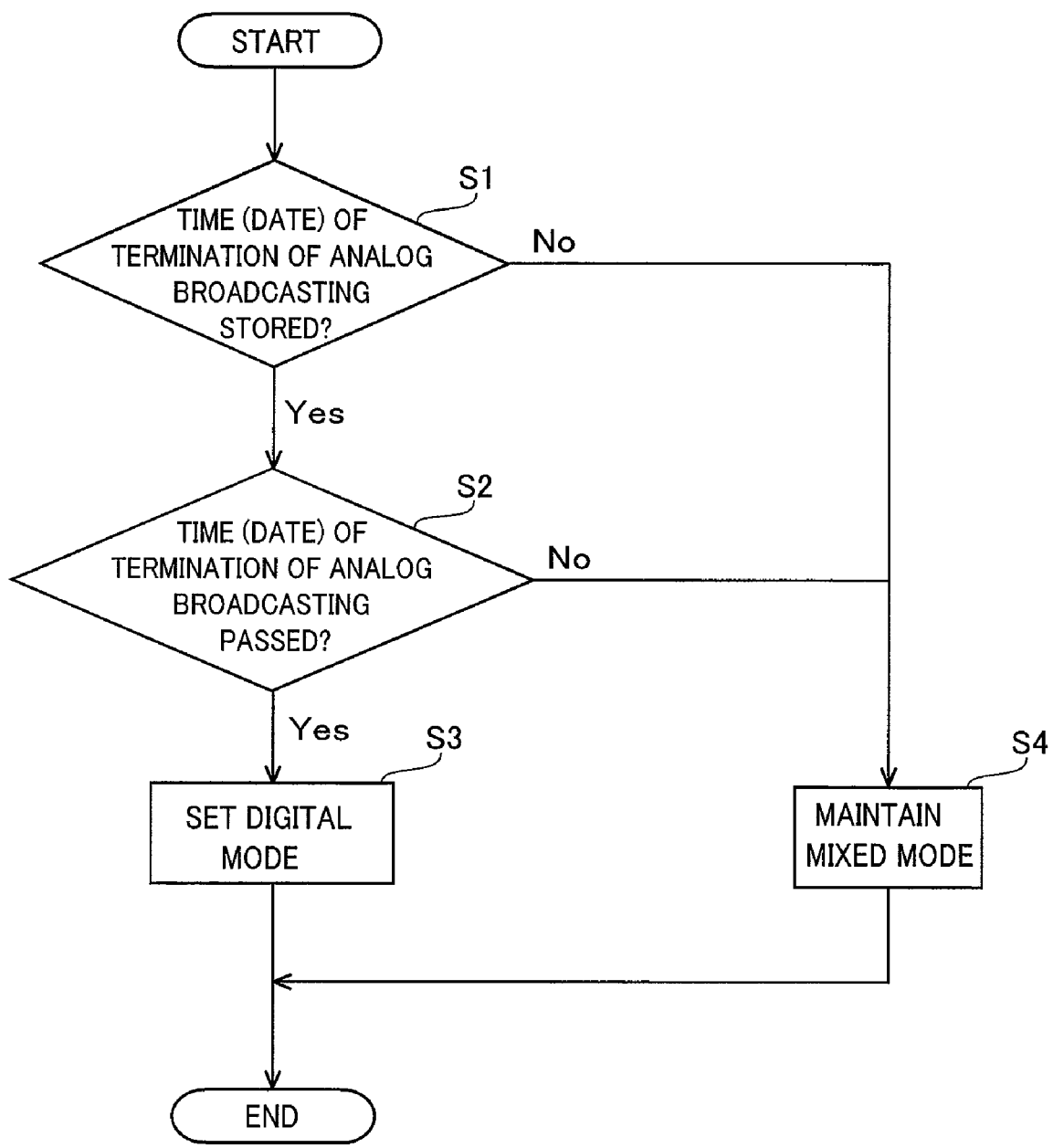

DISPLAY AND TELEVISION APPARATUS

BACKGROUND OF THE INVENTION

1. Field of the Invention

This invention relates to a display and a television apparatus, and more particularly, it relates to a display and a television apparatus comprising a receiving portion capable of receiving analog broadcasting and digital broadcasting.

2. Description of the Background Art

A display or the like comprising a receiving portion capable of receiving analog broadcasting and digital broadcasting is known in general as disclosed in Japanese Patent Laying-Open No. 2006-5785, and Japanese Patent Nos. 3540242 and 3589178, for example.

The aforementioned Japanese Patent Laying-Open No. 2006-5785 discloses a television receiver comprising an analog broadcasting signal processing portion capable of receiving analog broadcasting and a digital broadcasting signal processing portion capable of receiving digital broadcasting. This television receiver according to Japanese Patent Laying-Open No. 2006-5785 has a function of stopping supplying power to the unnecessary analog broadcasting signal processing portion after abolishment (termination) of analog broadcasting. In other words, power was supplied to the two processing portion of the analog broadcasting signal processing portion and the digital broadcasting signal processing portion before the abolishment (termination) of the analog broadcasting, while the power is supplied only to the digital broadcasting signal processing portion after the abolishment (termination) of the analog broadcasting, thereby reducing power.

The aforementioned Japanese Patent No. 3540242 discloses a multi-system compliant receiving apparatus capable of receiving analog broadcasting and digital broadcasting. This multi-system compliant receiving apparatus according to Japanese Patent No. 3540242 has no function of responding to abolishment (termination) of analog broadcasting.

The aforementioned Japanese Patent No. 3589178 discloses a digital/analog television signal receiver capable of receiving an analog television signal (broadcasting) and a digital television signal (broadcasting). This digital/analog television signal receiver according to Japanese Patent No. 3589178 has no function of responding to abolishment (termination) of analog broadcasting.

In the television receiver described in the aforementioned Japanese Patent Laying-Open No. 2006-5785, however, power can be reduced by stopping supplying power to the unnecessary analog broadcasting signal processing portion after the abolishment (termination) of the analog broadcasting, while user's operability in response to the abolishment (termination) of the analog broadcasting can not be disadvantageously enhanced.

The multi-system compliant receiving apparatus described in the aforementioned Japanese Patent No. 3540242 and the digital/analog television signal receiver described in the aforementioned Japanese Patent No. 3589178 have no function of responding the abolishment (termination) of the analog broadcasting and hence user's operability in response to the abolishment (termination) of the analog broadcasting can not be disadvantageously enhanced.

SUMMARY OF THE INVENTION

The present invention has been proposed in order to solve the aforementioned problem, and an object of the present invention is to provide a display and a television apparatus capable of enhancing operability of a user in response to termination of analog broadcasting.

A display according to a first aspect of the present invention comprises a receiving portion capable of receiving analog broadcasting and digital broadcasting, a display portion capable of displaying an image received with the receiving portion, a mode switching portion capable of switching between mixed mode performing both processing of the analog broadcasting and processing of the digital broadcasting and digital mode preferentially performing the processing of the digital broadcasting, and a control portion controlling such that the mode switching portion switches the mixed mode to the digital mode when the analog broadcasting is terminated.

As hereinabove described, this display according to the first aspect comprises the mode switching portion capable of switching between the mixed mode performing both the processing of the analog broadcasting and the processing of the digital broadcasting and the digital mode giving priority to the processing of the digital broadcasting and the control portion controlling such that the mode switching portion switches the mixed mode to the digital mode when the analog broadcasting is terminated, whereby the processing of the digital broadcasting, the rate of utilization of which is increased due to the termination of the analog broadcasting, is given priority when the analog broadcasting is terminated, and hence operability of the user in response to the termination of the analog broadcasting can be enhanced.

In the aforementioned display according to the first aspect, a storage portion communicably connected to the control portion and storing time data of termination of the analog broadcasting is preferably provided, wherein the control portion is preferably so formed as to control such that the mode switching portion switches the mixed mode to the digital mode when current time has passed time of termination of the analog broadcasting stored in the storage portion. According to this structure, the control portion controls such that the mode switching portion switches the mixed mode to the digital mode on the basis of the time data of the termination of the analog broadcasting stored in the storage portion and hence a switching operation of the mixed mode to the digital mode by the user is not required in response to the termination of the analog broadcasting.

In this case, the display preferably further comprises a body portion, wherein the control portion is preferably so formed as to determine whether or not the current time has passed the time of the termination of the analog broadcasting stored in the storage portion by comparing the current time with the time of the termination of the analog broadcasting stored in the storage portion at least when the body portion is brought into an ON-state. According to this structure, the control portion can determine that the current time has passed the time of the termination of the analog broadcasting when the body portion is turned on, also in a case where the current time had passed the time of the termination of the analog broadcasting when the body portion was in an OFF-state. Consequently, the control portion can switch the mixed mode to the digital mode when the body portion is brought into the ON-state.

In the aforementioned display according to the first aspect, the control portion is preferably so formed as to control such that the receiving portion detects both the receivable analog broadcasting and the receivable digital broadcasting when the mode switching portion sets the mixed mode and detects only the receivable digital broadcasting when the mode switching portion sets the digital mode. According to this structure, the receiving portion does not detect the analog broadcasting when the digital mode is set and hence the time required for detecting receivable broadcast can be reduced. This can also enhance operability of the user.

In this case, the control portion is preferably so formed as to set to be capable of selecting both channels of the analog broadcasting and the digital broadcasting at initial setting when the mode switching portion sets the mixed mode and to be capable of selecting only a channel of the digital broadcasting at the initial setting when the mode switching portion sets the digital mode. According to this structure, the control portion does not set to be capable of selecting the channels of the analog broadcasting at the initial setting when the digital mode is set and hence the time required for setting can be reduced. This can also further enhance operability of the user.

In the aforementioned display according to the first aspect, the control portion is preferably so formed as to control such that the display portion preferentially displays the item corresponding to the digital broadcasting than the item corresponding to the analog broadcasting on a screen for setting a function displayed on the display portion when the mode switching portion sets the digital mode. According to this structure, the item corresponding to the digital broadcasting, the rate of utilization of which is increased due to the termination of the analog broadcasting, is preferentially displayed on the display portion when the digital mode is set, and hence operability of the user can be further enhanced.

In this case, the control portion is preferably so formed as to control such that the display portion displays the item corresponding to the analog broadcasting in addition to the item corresponding to the digital broadcasting on the display for setting the function displayed on the display portion also in a case where the analog broadcasting is terminated when the mode switching portion sets the digital mode. According to this structure, a function corresponding to an analog image can be set also when the analog image is acquired from an external device such as a video reproducer after the analog broadcasting is terminated.

In the aforementioned display according to the first aspect, the control portion preferably controls such that only the digital broadcasting is selected in response to operation of the select button of the remote control when the mode switching portion sets the digital mode. According to this structure, only the digital broadcasting is selected when the analog broadcasting is terminated and hence operability of the user can be further enhanced.

A display according to a second aspect of the present invention comprises a receiving portion capable of receiving analog broadcasting and digital broadcasting, a display portion capable of displaying an image received with the receiving portion, a mode switching portion capable of switching between mixed mode performing both processing of the analog broadcasting and processing of the digital broadcasting and digital mode preferentially performing the processing of the digital broadcasting, a control portion controlling such that the mode switching portion switches the mixed mode to the digital mode when the analog broadcasting is terminated, a storage portion communicably connected to the control portion and storing time data of termination of the analog broadcasting, and a remote control having a select button capable of performing selection of the analog broadcasting and the digital broadcasting. The control portion is so formed as to control such that the mode switching portion switches the mixed mode to the digital mode when current time has passed time of termination of the analog broadcasting stored in the storage portion. The control portion is so formed as to control such that the receiving portion detects both the receivable analog broadcasting and the receivable digital broadcasting, the display portion preferentially displays an item corresponding to the analog broadcasting than an item corresponding to the digital broadcasting on a screen for setting a function displayed on the display portion and the analog broadcasting is preferentially selected in response to operation of the select button of the remote control, when the mode switching portion sets the mixed mode. The control portion is so formed as to control such that the receiving portion detects only the receivable digital broadcasting, the display portion preferentially displays the item corresponding to the digital broadcasting than the item corresponding to the analog broadcasting on a screen for setting a function displayed on the display portion and only the digital broadcasting is selected in response to operation of the select button of the remote control, when the mode switching portion sets the digital mode.

As hereinabove described, this display according to the second aspect comprises the mode switching portion capable of switching between the mixed mode performing both the processing of the analog broadcasting and the processing of the digital broadcasting and the digital mode giving priority to the processing of the digital broadcasting and the control portion controlling such that the mode switching portion switches the mixed mode to the digital mode when the analog broadcasting is terminated, whereby the processing of the digital broadcasting, the rate of utilization of which is increased due to the termination of the analog broadcasting, is given priority when the analog broadcasting is terminated, and hence operability of the user in response to the termination of the analog broadcasting can be enhanced. The storage portion storing time data of the termination of the analog broadcasting is provided, and the control portion is so formed as to control such that the mode switching portion switches the mixed mode to the digital mode when the current time has passed the time of the termination of the analog broadcasting stored in the storage portion, whereby the control portion controls such that the mode switching portion switches the mixed mode to the digital mode on the basis of the time data of the termination of the analog broadcasting stored in the storage portion and hence a switching operation of the mixed mode to the digital mode by the user is not required in response to the termination of the analog broadcasting. The control portion is so formed as to control such that the receiving portion detects both the receivable analog broadcasting and the receivable digital broadcasting when the mode switching portion sets the mixed mode and detects only the receivable digital broadcasting when the mode switching portion sets the digital mode, whereby the receiving portion does not detect the analog broadcasting when the digital mode is set and hence the time required for detecting receivable broadcast can be reduced. This can also enhance operability of the user. The control portion is so formed as to control such that the display portion preferentially displays the item corresponding to the digital broadcasting than the item corresponding to the analog broadcasting on a screen for setting a function displayed on the display portion when the mode switching portion sets the digital mode, whereby the item corresponding to the digital broadcasting, the rate of utilization of which is increased due to the termination of the analog broadcasting, is preferentially displayed on the display portion when the digital mode is set, and hence operability of the user can be further enhanced. The control portion controls such that only the digital broadcasting is selected in response to operation of the select button of the remote control when the mode switching portion sets the digital mode, whereby only the digital broadcasting is selected when the analog broadcasting is terminated and hence operability of the user can be further enhanced.

The aforementioned display according to the second aspect preferably further comprises a body portion, wherein the control portion is preferably so formed as to determine whether or not the current time has passed the time of the termination of the analog broadcasting stored in the storage portion by comparing the current time with the time of the termination of the analog broadcasting stored in the storage portion at least when the body portion is brought into an ON-state. According to this structure, the control portion can determine that the current time has passed the time of the termination of the analog broadcasting when the body portion is turned on, also in a case where the current time had passed the time of the termination of the analog broadcasting when the body portion was in an OFF-state. Consequently, the control portion can switch the mixed mode to the digital mode when the body portion is brought into the ON-state.

In the aforementioned display according to the second aspect, the control portion is preferably so formed as to set to be capable of selecting both channels of the analog broadcasting and the digital broadcasting at initial setting when the mode switching portion sets the mixed mode and to be capable of selecting only the channels of the digital broadcasting at initial setting when the mode switching portion sets the digital mode. According to this structure, the control portion does not set to be capable of selecting the channels of the analog broadcasting at the initial setting when the digital mode is set and hence the time required for setting can be reduced. This can also further enhance operability of the user.

In the aforementioned display according to the second aspect, the control portion is preferably so formed as to control such that the display portion displays the item corresponding to the analog broadcasting in addition to the item corresponding to the digital broadcasting on the display for setting the function displayed on the display portion also in a case where the analog broadcasting is terminated when the mode switching portion sets the digital mode. According to this structure, a function corresponding to an analog image can be set also when the analog image is acquired from an external device such as a video reproducer after the analog broadcasting is terminated.

A television apparatus according to a third aspect of the present invention comprises a receiving portion capable of receiving analog broadcasting and digital broadcasting, a display portion capable of displaying an image received with the receiving portion, a mode switching portion capable of switching between mixed mode performing both processing of the analog broadcasting and processing of the digital broadcasting and digital mode preferentially performing processing of the digital broadcasting, and a control portion controlling such that the mode switching portion switches the mixed mode to the digital mode when the analog broadcasting is terminated.

As hereinabove described, this television apparatus according to the third aspect comprises the mode switching portion capable of switching between the mixed mode performing both the processing of the analog broadcasting and the processing of the digital broadcasting and the digital mode giving priority to the processing of the digital broadcasting and the control portion controlling such that the mode switching portion switches the mixed mode to the digital mode when the analog broadcasting is terminated, whereby the processing of the digital broadcasting, the rate of utilization of which is increased due to the termination of the analog broadcasting, is given priority when the analog broadcasting is terminated, and hence operability of the user in response to the termination of the analog broadcasting can be enhanced.

In the aforementioned television apparatus according to the third aspect, a storage portion communicably connected to the control portion and storing time data of termination of the analog broadcasting is preferably provided, wherein the control portion is so formed as to control such that the mode switching portion switches the mixed mode to the digital mode when current time has passed time of termination of the analog broadcasting stored in the storage portion. According to this structure, the control portion controls such that the mode switching portion switches the mixed mode to the digital mode on the basis of the time data of the termination of the analog broadcasting stored in the storage portion and hence a switching operation of the mixed mode to the digital mode by the user is not required in response to the termination of the analog broadcasting.

In the aforementioned television apparatus according to the third aspect, the control portion is preferably so formed as to control such that the receiving portion detects both the receivable analog broadcasting and the receivable digital broadcasting when the mode switching portion sets the mixed mode and detects only the receivable digital broadcasting when the mode switching portion sets the digital mode. According to this structure, the receiving portion does not detect the analog broadcasting when the digital mode is set and hence the time required for detecting receivable broadcast can be reduced. This can also enhance operability of the user.

In the aforementioned television apparatus according to the third aspect, the control portion is preferably so formed as to control such that the display portion preferentially displays an item corresponding to the digital broadcasting than an item corresponding to the analog broadcasting on a screen for setting a function displayed on the display portion when the mode switching portion sets the digital mode. According to this structure, the item corresponding to the digital broadcasting, the rate of utilization of which is increased due to the termination of the analog broadcasting, is preferentially displayed on the display portion when the digital mode is set, and hence operability of the user can be further enhanced.

In the aforementioned television apparatus according to the third aspect, the control portion preferably controls such that only the digital broadcasting is selected in response to operation of the select button of the remote control when the mode switching portion sets the digital mode. According to this structure, only the digital broadcasting is selected when the analog broadcasting is terminated and hence operability of the user can be further enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing comparison between mixed mode and digital mode of the digital broadcasting compliant television according to the embodiment of the present invention shown in FIG. 1;

FIG. 5 is a diagram showing a CC setup screen in the mixed mode displayed on a display portion of the digital broadcasting compliant television according to the embodiment of the present invention shown in FIG. 1;

FIG. 10 is a flow chart for illustrating a mode switching operation of the digital broadcasting compliant television according to the embodiment of the present invention shown in FIG. 1.

DESCRIPTION OF THE PREFERRED EMBODIMENTS

An embodiment of the present invention will be hereinafter described with reference to the drawings.

A structure of a digital broadcasting compliant television according to an embodiment of the present invention will be described with reference to FIGS. 1 to 9. This embodiment of the present invention is applied to the digital broadcasting compliant television employed as an exemplary display.

Figure 1:
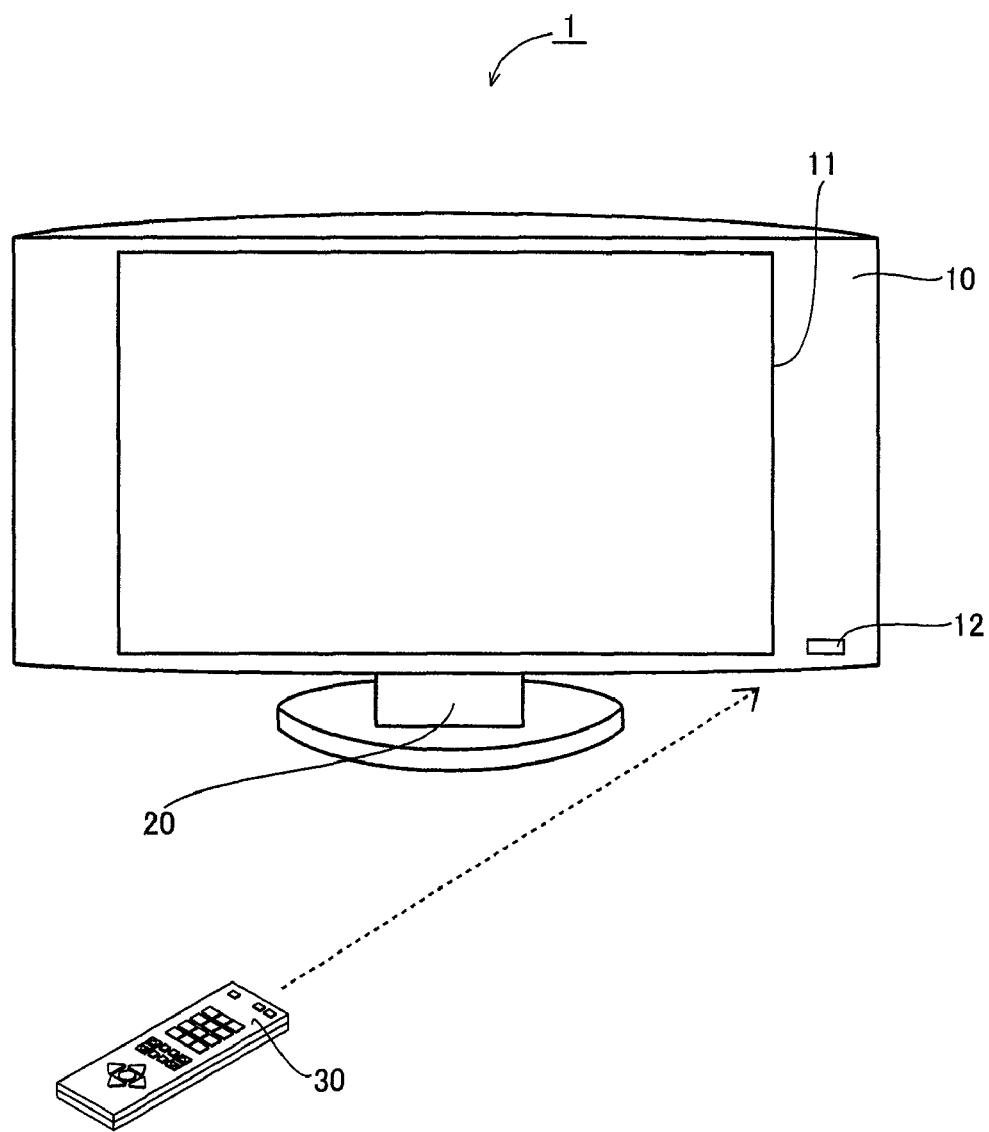
FIG. 1 is a perspective view showing an overall structure of a digital broadcasting compliant television according to an embodiment of the present invention.

A digital broadcasting compliant television 1 according to the embodiment of the present invention is constituted by a television body 10, a leg portion 20 supporting the television body 10 and a remote control 30, as shown in FIG. 1. The television body 10 is an example of the "body portion" in the present invention.

As shown in FIG. 1, a display portion 11 for displaying images and a remote control receiving portion 12 receiving an optical signal transmitted from the remote control 30 capable of operating the television body 10 are arranged on a front surface of the television body 10.

Figure 2:
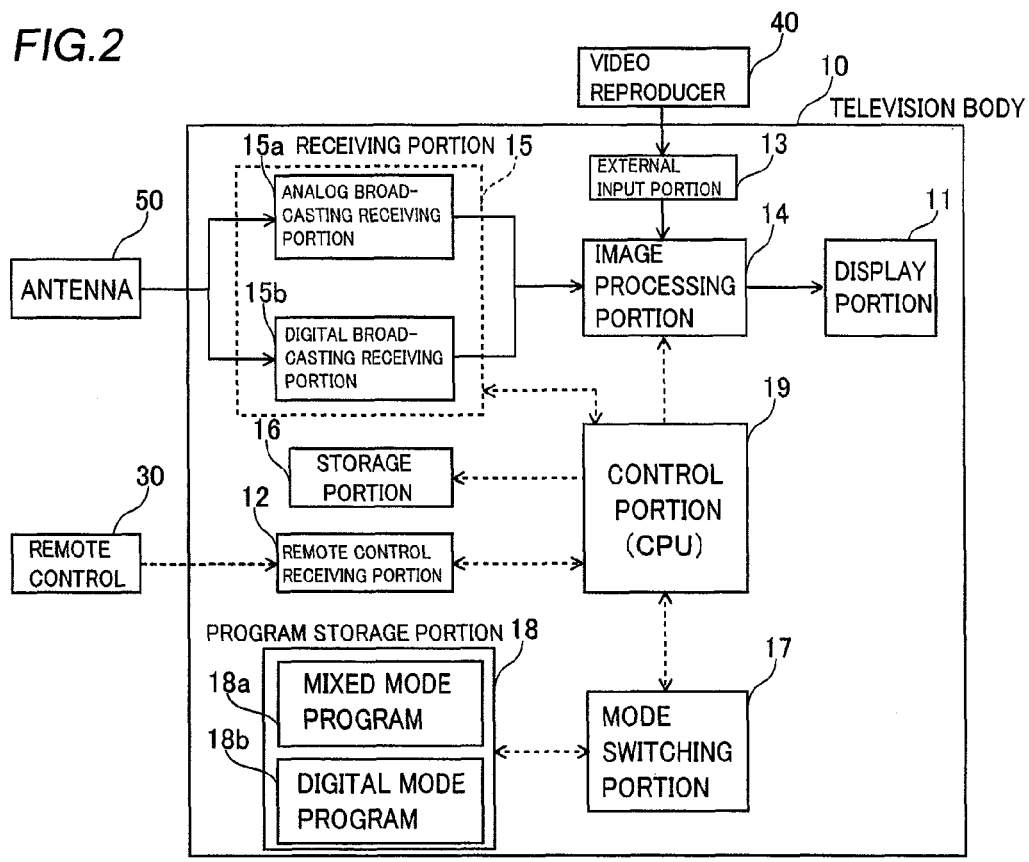
FIG. 2 is a block diagram for illustrating the structure of the digital broadcasting compliant television according to the embodiment of the present invention shown in FIG. 1.

As shown in FIG. 2, the television body 10 comprises an external input portion 13 capable of acquiring images produced by a video reproducer 40 employed as an external device, an image processing portion 14 performing a processing of images, a receiving portion 15 capable of receiving analog broadcasting and digital broadcasting through an antenna 50, a storage portion 16 storing time data of termination of the analog broadcasting, a mode switching portion 17 capable of performing a switching operation of mode, a program storage portion 18 connecting to the mode switching portion 17 and a control portion 19 controlling an overall operation of the television body 10, in addition to the aforementioned display portion 11 and remote control receiving portion 12.

Figure 3:
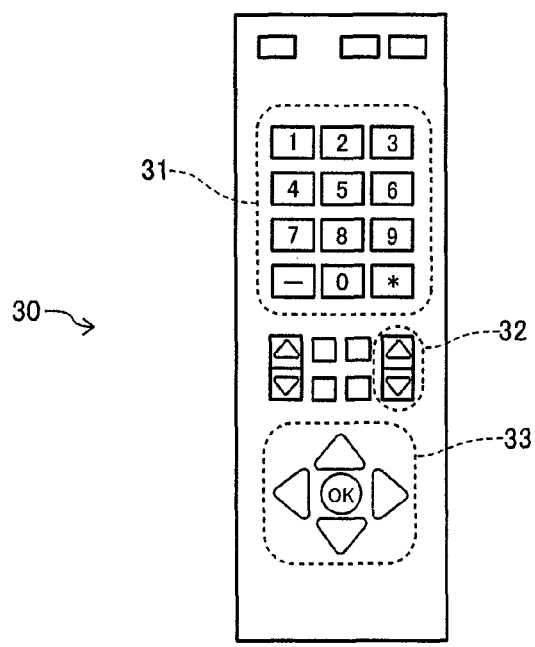
FIG. 3 is a front elevational view showing a remote control of the digital broadcasting compliant television according to the embodiment of the present invention shown in FIG. 1.

As shown in FIG. 3, the remote control 30 comprises direct select buttons 31 capable of directly inputting a channel number for selecting a channel, channel list select buttons 32 capable of successively selecting channels and select buttons 33. The direct select buttons 31 and the channel list select buttons 32 are examples of the "select buttons" in the present invention.

The external input portion 13 is so formed as to transmit images acquired from the video reproducer 40 to the image processing portion 14. The image processing portion 14 processes such that the display portion 11 is capable of displaying images acquired from the external input portion 13 and the receiving portion 15.

According to this embodiment, the receiving portion 15 includes an analog broadcasting receiving portion 15a capable of receiving analog broadcasting and a digital broadcasting receiving portion 15b capable of receiving digital broadcasting. The receiving portion 15 is so formed as to transmit images received by the analog and digital broadcasting receiving portions 15a and 15b to the image processing portion 14.

The mode switching portion 17 is so formed as to be capable of switching the mixed mode to the digital mode with a signal from the control portion 19 when the analog broadcasting is terminated. More specifically, the mode switching portion 17 switches a program employed by the control portion 19 from a mixed mode program 18a stored in the program storage portion 18 to a digital mode program 18b so that the mixed mode is switched to the digital mode.

The mixed mode is so formed as to be controlled by the mixed mode program 18a and perform both processing of analog broadcasting and processing of digital broadcasting. More specifically, in the mixed mode, the receiving portion 15 is formed such that the analog and digital broadcasting receiving portions 15a and 15b detect both channels of the analog and digital broadcasting respectively by an auto scan function automatically detecting channels receivable at initial setting, as shown in FIG. 4. At this time, the control portion 19 is so formed as to set to be capable of selecting the both channels of the analog and digital broadcasting. In the mixed mode, the display portion 11 is so formed as to preferentially display items corresponding to the analog broadcasting than items corresponding to the digital broadcasting on setup screens 60 (see FIG. 5) and 61 (see FIG. 6) for setting functions described later, as shown in FIG. 4. In the mixed mode, the channels of the analog broadcasting are preferentially selected when the direct select buttons 31 of the remote control 30 perform direct selection, as shown in FIG. 4. In the mixed mode, the both channels of the analog and digital broadcasting are selected when the channel list select buttons 32 of the remote control 30 perform channels list selection, as shown in FIG. 4.

A CC (closed caption) setup screen 60 (see FIG. 5) and a V-CHIP setup screen 61 (see FIG. 6) are employed as a setup screen in the mixed mode displayed on the display portion 11. The CC (closed caption) is a closed-captioned broadcast displaying speech information or the like as textual information. The V-CHIP is a parental lock for a program including extreme contents such as a scene of violence.

As shown in FIG. 5, the CC setup screen 60 in the mixed mode is so formed as to preferentially display set items of CAPTION corresponding to the analog broadcasting than set items of DTVCC corresponding to the digital broadcasting. The set items of CAPTION corresponding to the analog broadcasting is so formed as to display an item for switching between an ON-state and an OFF-state of caption and a plurality of selectable captions (CC1, CC2 and CC3), as shown in FIG. 5.

The set items of DTVCC corresponding to the digital broadcasting is so formed as to display an item for switching between an ON-state and an OFF-state of caption and a plurality of selectable captions (SERVICE1, SERVICE2 and SERVICE3), as shown in FIG. 5. A pointer 70 (see FIGS. 5 to 9) for selecting each item is displayed on the display portion 11. The pointer 70 is so formed as to be capable of selecting each item by operating the select buttons 33 of the remote control 30, as shown in FIG. 7.

Figure 6:
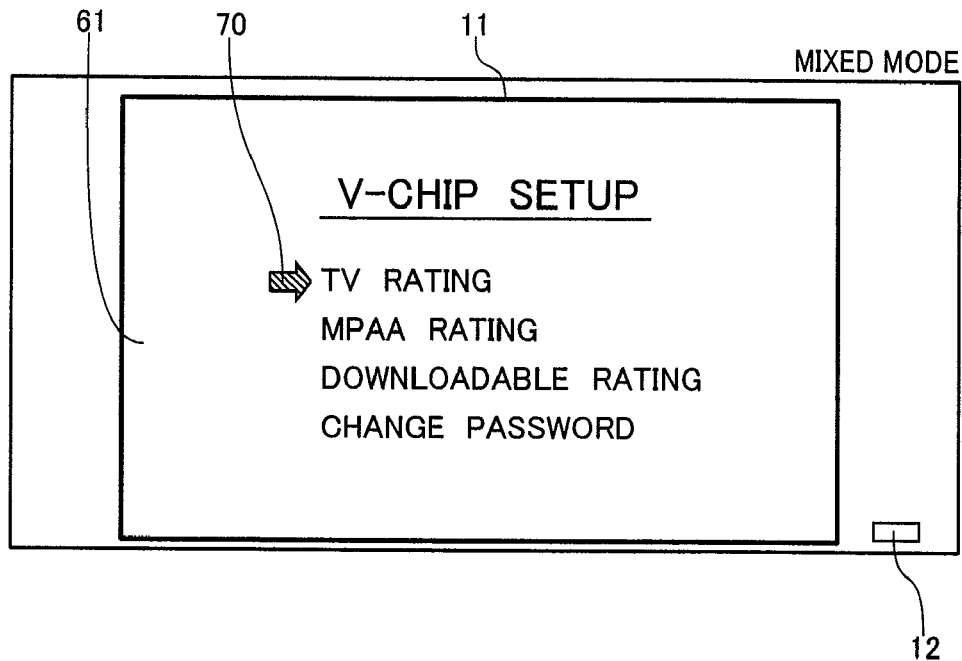
FIG. 6 is a diagram showing a V-CHIP setup screen in the mixed mode displayed on the display portion of the digital broadcasting compliant television according to the embodiment of the present invention shown in FIG. 1.
Figure 7:
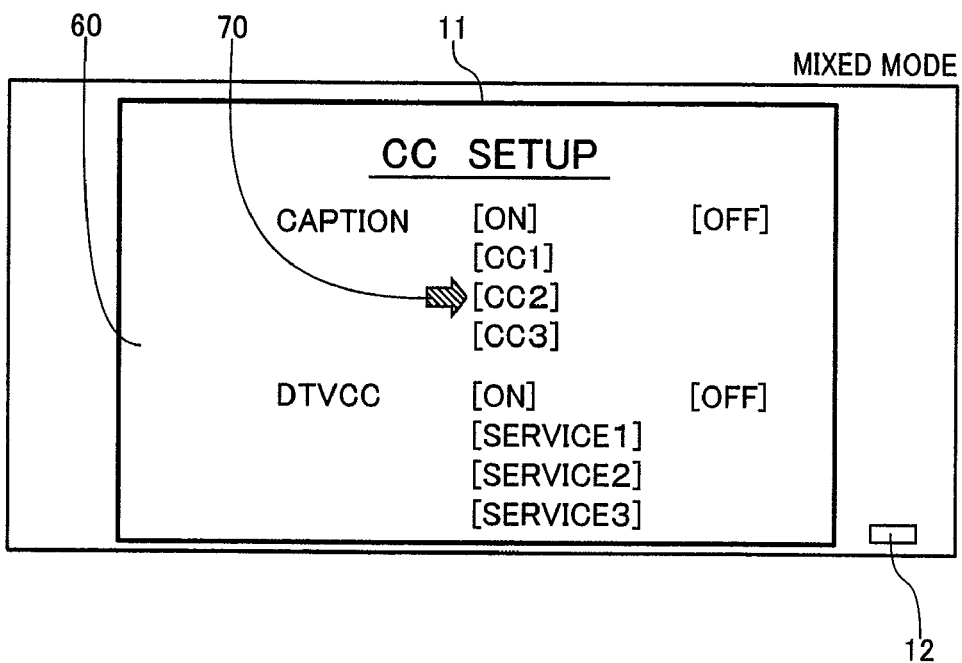
FIG. 7 is a diagram showing a CC setup screen in the mixed mode displayed on the display portion of the digital broadcasting compliant television according to the embodiment of the present invention shown in FIG. 1.

As shown in FIG. 6, the V-CHIP setup screen 61 in the mixed mode is so formed as to preferentially display TV RATING and MPAA RATING corresponding to the analog broadcasting than DOWNLOADABLE RATING corresponding to the digital broadcasting. An item of CHANGE PASSWORD for changing a password necessary for changing the setting of V-CHIP is displayed on a bottom step. The TV RATING is one of the standards of V-CHIP employed as parental lock for television broadcast. MPAA RATING is one of the standards of V-CHIP employed as parental lock for movies. DOWNLOADABLE RATING is one of the standards of V-CHIP corresponding to the digital broadcasting.

The digital mode is so formed as to be controlled by the digital mode program and preferentially perform the processing of digital broadcasting when the analog broadcasting is terminated. More specifically, in the digital mode, the receiving portion 15 is formed such that the digital broadcasting receiving portion 15b detects only channels of the digital broadcasting by the auto scan function, as shown in FIG. 4. At this time, the control portion 19 is so formed as to set to be capable of selecting only the channels of the digital broadcasting. In the digital mode, items corresponding to the digital broadcasting is preferentially displayed than items corresponding to the analog broadcasting on setup screens 62 (see FIG. 8) and 63 (see FIG. 9) for setting functions displayed on the display portion 11, as shown in FIG. 4. The reason why the items corresponding to the analog broadcasting are displayed also when the analog broadcasting was terminated is to respond to analog images acquired from the video reproducer 40 through the external input portion 13. The digital mode is so formed as to select only the channels of the digital broadcasting when the direct selection is performed with the direct select buttons 31 of the remote control 30, as shown in FIG. 4. Additionally, the digital mode is so formed as to select only the channels of the digital broadcasting when the channel list selection is performed with the channel list select buttons 32 of the remote control 30, as shown in FIG. 4.

A CC setup screen 62 (see FIG. 8) and a V-CHIP setup screen 63 (see FIG. 9) are employed as a setup screen in the digital mode displayed on the display portion 11.

Figure 8:
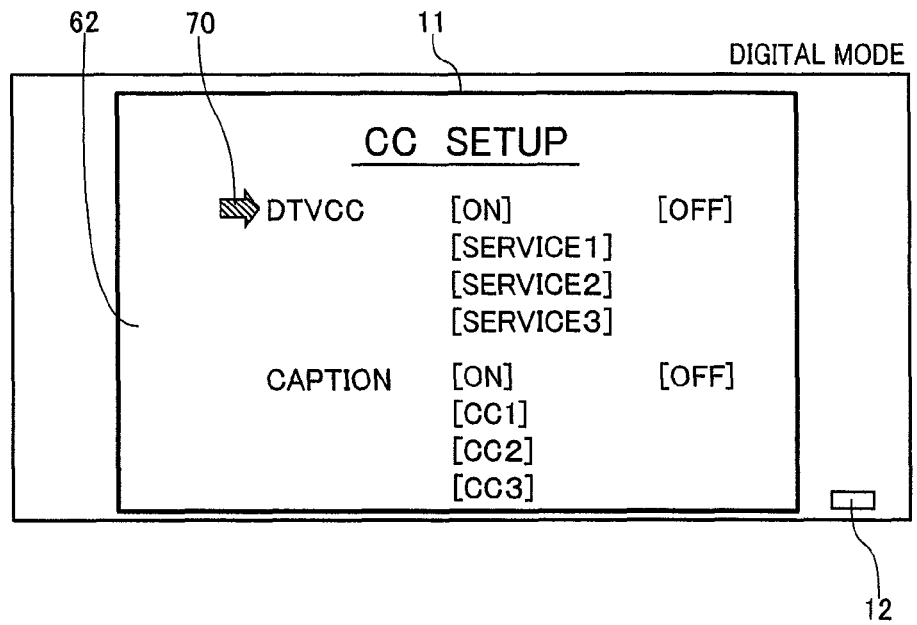
FIG. 8 is a diagram showing a CC setup screen in the digital mode displayed on the display portion of the digital broadcasting compliant television according to the embodiment of the present invention shown in FIG. 1.

As shown in FIG. 8, the CC setup screen 62 is so formed as to preferentially display set items of DTVCC corresponding to the digital broadcasting by displaying the same above set items of CAPTION corresponding to the analog broadcasting.

Figure 9:
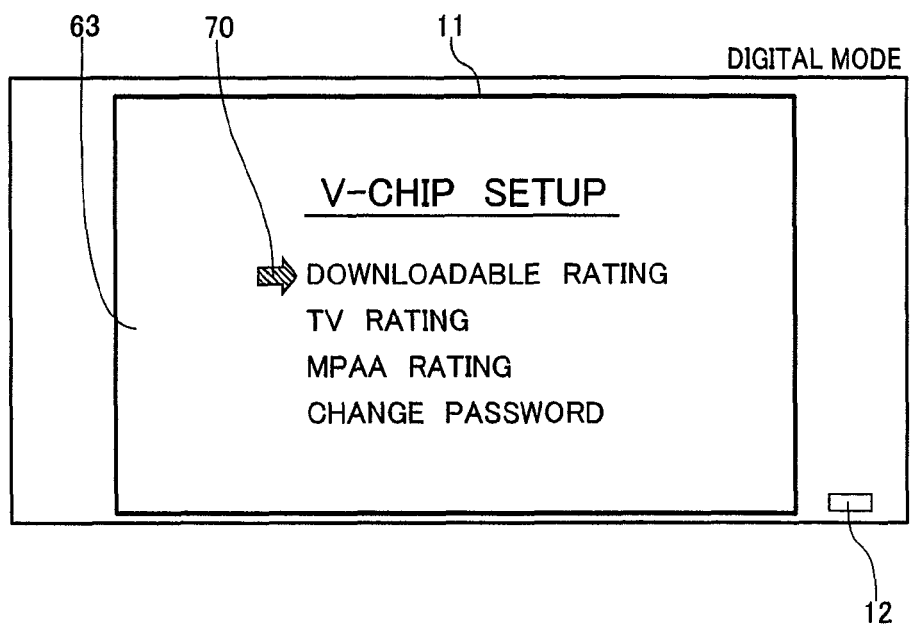
FIG. 9 is a diagram showing a V-CHIP setup screen in the digital mode displayed on the display portion of the digital broadcasting compliant television according to the embodiment of the present invention shown in FIG. 1.

As shown in FIG. 9, the V-CHIP setup screen 63 in the digital mode is so formed as to preferentially display DOWNLOADABLE RATING corresponding to the digital broadcasting by displaying the same above TV RATING and MPAA RATING corresponding to the analog broadcasting.

The control portion 19 has a clock function recognizing current time. The control portion 19 is so formed as to determine whether or not the current time has passed the time of the termination of the analog broadcasting by comparing the current time with the time of the termination of the analog broadcasting when the television body 10 is brought into an ON-state. The control portion 19 is so formed as to control such that the mode switching portion 17 switches the mixed mode to the digital mode when the current time has passed the time of the termination of the analog broadcasting and sets the digital mode as a mode employed after the termination of the analog broadcasting.

A mode switching operation of the digital broadcasting compliant television according to the embodiment of the present invention will be described with reference to FIG. 10.

At a step S1 in FIG. 10, it has been determined whether or not time data of the termination of the analog broadcasting is stored in the storage portion 16. The time data of the termination of the analog broadcasting is stored in the storage portion 16 by a user or a manufacturer before shipment. If it is determined that the time data of the termination of the analog broadcasting is stored in the storage portion 16, the process advances to a step S2. At the step S2, it is determined whether or not the current time has passed the time (date) of the termination of the analog broadcasting. If it is determined that the current time has passed the time (date) of the termination of the analog broadcasting, the process advances to a step S3. At the step S3, the mode switching portion 17 switches the mixed mode to the digital mode, the digital mode is set as the mode employed after the termination of the analog broadcasting, and the operation is ended. If it is determined that the time data of the termination of the analog broadcasting is not stored in the storage portion 16 at the step S1, and if it is determined that the current time has not passed the time of the termination of the analog broadcasting at the step S2, the process advances to a step S4. At the step S4, the setting of the mixed mode is maintained without switching to the digital mode and the operation is ended.

According to this embodiment, as hereinabove described, the digital broadcasting compliant television comprises the mode switching portion 17 capable of switching between the mixed mode performing both the processing of the analog broadcasting and the processing of the digital broadcasting and the digital mode giving priority to the processing of the digital broadcasting and the control portion 19 controlling such that the mode switching portion 17 switches the mixed mode to the digital mode when the analog broadcasting is terminated, whereby the processing of the digital broadcasting, the rate of utilization of which is increased due to the termination of the analog broadcasting, is given priority, and hence operability of the user in response to the termination of the analog broadcasting can be enhanced.

According to this embodiment, the storage portion 16 storing the time data of the termination of the analog broadcasting is provided, and the control portion 19 is so formed as to control such that the mode switching portion 17 switches the mixed mode to the digital mode when the current time has passed the time of the termination of the analog broadcasting stored in the storage portion 16, whereby the control portion 19 is so formed as to control such that the mode switching portion 17 switches the mixed mode to the digital mode on the basis of the time data of the termination of the analog broadcasting stored in the storage portion 16 and hence a switching operation of the mixed mode to the digital mode by the user is not required in response to the termination of the analog broadcasting.

According to this embodiment, the control portion 19 is so formed as to control such that the receiving portion 15 detects the both receivable analog broadcasting and digital broadcasting when the mode switching portion 17 sets the mixed mode and detects only the receivable digital broadcasting when the mode switching portion 17 sets the digital mode, whereby the analog broadcasting receiving portion 15a of the receiving portion 15 does not detect the analog broadcasting when the digital mode is set and hence the time required for detecting receivable broadcast can be reduced. This can also enhance operability of the user.

According to this embodiment, the control portion 19 is so formed as to control such that the display portion 11 preferentially displays the items corresponding to the digital broadcasting than the items corresponding to the analog broadcasting on the setup screens 62 and 63 for setting the functions displayed on the display portion 11 when the mode switching portion 17 sets the digital mode, whereby the display portion 11 preferentially displays the items corresponding to the digital broadcasting increasing the ratio of the users utilizing the digital broadcasting due to the termination of the analog broadcasting when the digital mode is set, and hence operability of the user can be further enhanced.

According to this embodiment, the control portion 19 is so formed as to control such that only the digital broadcasting is selected in response to the operation of the select buttons 31 and 32 of the remote control 30 when the mode switching portion 17 sets the digital mode, whereby only the digital broadcasting is selected when the analog broadcasting is terminated and hence operability of the user can be further enhanced.

According to this embodiment, the control portion 19 is so formed as to determine whether or not the current time has passed the time of the termination of the analog broadcasting by comparing the current time with the time of the termination of the analog broadcasting when the television body 10 is brought into the ON-state, whereby the control portion 19 can determine that the current time has passed the time of the termination of the analog broadcasting when the television body 10 is turned on, also in a case where the current time had passed the time of the termination of the analog broadcasting when the television body 10 was in an OFF-state. Consequently, the control portion 19 can switch the mixed mode to the digital mode when the television body 10 is brought into the ON-state.

According to this embodiment, the control portion 19 is so formed as to set to be capable of selecting the both channels of the analog and digital broadcasting at the initial setting when the mode switching portion 17 sets the mixed mode and to be capable of selecting only the channels of the digital broadcasting at the initial setting when the mode switching portion 17 sets the digital mode, whereby the control portion 19 does not set to be capable of selecting the channels of the analog broadcasting at the initial setting when the digital mode is set and hence the time required for setting can be reduced. This can also enhance operability of the user.

Although the present invention has been described and illustrated in detail, it is clearly understood that the same is by way of illustration and example only and is not to be taken by way of limitation, the spirit and scope of the present invention being limited only by the terms of the appended claims.

For example, while the digital broadcasting compliant television is employed as an exemplary display in the aforementioned embodiment, the present invention is not restricted to this but is also applicable to a display other than the digital broadcasting compliant television so far as the display comprises a receiving portion capable of receiving analog broadcasting and digital broadcasting.

While the control portion 19 has the clock function recognizing the current time in the aforementioned embodiment, the present invention is not restricted to this but the control portion 19 may be alternatively formed so as to acquire current time by another method.

While the control portion 19 compares the current time with the time of the termination of the analog broadcasting when the television body 10 is brought into the ON-state and controls the mode switching portion 17 so as to switch the mixed mode to the digital mode when the current time has passed the time of the termination of the analog broadcasting in the aforementioned embodiment, the present invention is not restricted to this but the control portion 19 may compare the current time with the time of the termination of the analog broadcasting also when the television body 10 is in an OFF-state and control the mode switching portion 17 so as to switch the mixed mode to the digital mode when the current time has passed the time of the termination of the analog broadcasting While the CC setup screens 60 and 62, and the V-CHIP setup screens 61 and 63 displayed on the display portion 11 are described in the aforementioned embodiment, the present invention is not restricted to this but a setup screen displaying other items may be alternatively employed. Also in this case, items corresponding to the digital broadcasting are preferentially displayed than items corresponding to the analog broadcasting when the digital mode is set.

While the video reproducer 40 is employed as an exemplary external device in the aforementioned embodiment, the present invention is not restricted to this but is also applicable to another external device so far as the external input portion 13 is capable of acquiring images.

What is claimed is:

1. A display comprising:
   a receiving portion capable of receiving analog broadcasting and digital broadcasting;
   a display portion capable of displaying an image received with said receiving portion;
   a mode switching portion capable of switching between mixed mode performing both processing of said analog broadcasting and processing of said digital broadcasting and digital mode preferentially performing the processing of said digital broadcasting;
   a control portion controlling such that said mode switching portion switches said mixed mode to said digital mode when said analog broadcasting is terminated; and
   a storage portion communicably connected to said control portion and storing time data of termination of said analog broadcasting in advance, wherein said control portion is operatively configured to control such that said mode switching portion switches said mixed mode to said digital mode when current time has passed time of termination of said analog broadcasting stored in said storage portion in advance.

2. The display according to claim 1, further comprising a body portion, wherein
   said control portion is so formed as to determine whether or not the current time has passed the time of the termination of said analog broadcasting stored in said storage portion by comparing the current time with the time of the termination of said analog broadcasting stored in said storage portion at least when said body portion is brought into an ON-state.

3. The display according to claim 1, wherein
   said control portion is so formed as to control such that said receiving portion detects both said receivable analog broadcasting and said receivable digital broadcasting when said mode switching portion sets said mixed mode and detects only said receivable digital broadcasting when said mode switching portion sets said digital mode.

4. The display according to claim 3, wherein
   said control portion is so formed as to set to be capable of selecting both channels of said analog broadcasting and said digital broadcasting at initial setting when said mode switching portion sets said mixed mode and to be capable of selecting only a channel of said digital broadcasting at the initial setting when said mode switching portion sets said digital mode.

5. The display according to claim 1, wherein
said control portion is so formed as to control such that said display portion preferentially displays an item corresponding to said analog broadcasting than an item corresponding to said digital broadcasting on a screen for setting a function displayed on said display portion when said mode switching portion sets said mixed mode and preferentially displays the item corresponding to said digital broadcasting than the item corresponding to said analog broadcasting on a screen for setting a function displayed on said display portion when said mode switching portion sets said digital mode.

6. The display according to claim 5, wherein
said control portion is so formed as to control such that said display portion displays the item corresponding to said analog broadcasting in addition to the item corresponding to said digital broadcasting on the display for setting the function displayed on said display portion also in a case where said analog broadcasting is terminated when said mode switching portion sets said digital mode.

7. The display according to claim 1, further comprising a remote control having a select button capable of performing selection of said analog broadcasting and said digital broadcasting, wherein
said control portion is so formed as to control such that said analog broadcasting is preferentially selected in response to operation of said select button of said remote control when said mode switching portion sets said mixed mode and only said digital broadcasting is selected in response to operation of said select button of said remote control when said mode switching portion sets said digital mode.

8. A display comprising:
a receiving portion capable of receiving analog broadcasting and digital broadcasting;
a display portion capable of displaying an image received with said receiving portion;
a mode switching portion capable of switching between mixed mode performing both processing of said analog broadcasting and processing of said digital broadcasting and digital mode preferentially performing the processing of said digital broadcasting;
a control portion controlling such that said mode switching portion switches said mixed mode to said digital mode when said analog broadcasting is terminated;
a storage portion communicably connected to said control portion and storing time data of termination of said analog broadcasting in advance; and
a remote control having a select button capable of performing selection of said analog broadcasting and said digital broadcasting, wherein
said control portion is so formed as to control such that said mode switching portion switches said mixed mode to said digital mode when current time has passed time of termination of said analog broadcasting stored in said storage portion in advance,
said control portion is so formed as to control such that said receiving portion detects both said receivable analog broadcasting and said receivable digital broadcasting, said display portion preferentially displays an item corresponding to said analog broadcasting than an item corresponding to said digital broadcasting on a screen for setting a function displayed on said display portion and said analog broadcasting is preferentially selected in response to operation of said select button of said remote control, when said mode switching portion sets said mixed mode, and
said control portion is so formed as to control such that said receiving portion detects only said receivable digital broadcasting, said display portion preferentially displays the item corresponding to said digital broadcasting than the item corresponding to said analog broadcasting on a screen for setting a function displayed on said display portion and only said digital broadcasting is selected in response to operation of said select button of said remote control, when said mode switching portion sets said digital mode.

9. The display according to claim 8, further comprising a body portion, wherein
said control portion is so formed as to determine whether or not the current time has passed the time of the termination of said analog broadcasting stored in said storage portion by comparing the current time with the time of the termination of said analog broadcasting stored in said storage portion at least when said body portion is brought into an ON-state.

10. The display according to claim 8, wherein
said control portion is so formed as to set to be capable of selecting both channels of said analog broadcasting and said digital broadcasting at initial setting when said mode switching portion sets said mixed mode and to be capable of selecting only said channels of said digital broadcasting at initial setting when said mode switching portion sets said digital mode.

11. The display according to claim 8, wherein
said control portion is so formed as to control such that said display portion displays the item corresponding to said analog broadcasting in addition to the item corresponding to said digital broadcasting on the display for setting the function displayed on said display portion also in a case where said analog broadcasting is terminated when said mode switching portion sets said digital mode.

12. A television apparatus comprising:
a receiving portion capable of receiving analog broadcasting and digital broadcasting;
a display portion capable of displaying an image received with said receiving portion;
a mode switching portion capable of switching between mixed mode performing both processing of said analog broadcasting and processing of said digital broadcasting and digital mode preferentially performing processing of said digital broadcasting;
a control portion controlling such that said mode switching portion switches said mixed mode to said digital mode when said analog broadcasting is terminated; and
a storage portion communicably connected to said control portion and storing time data of termination of said analog broadcasting in advance, wherein said control portion is operatively configured to control such that said mode switching portion switches said mixed mode to said digital mode when current time has passed time of termination of said analog broadcasting stored in said storage portion in advance.

13. The television apparatus according to claim 12, wherein
said control portion is so formed as to control such that said receiving portion detects both said receivable analog broadcasting and said receivable digital broadcasting when said mode switching portion sets said mixed mode and detects only said receivable digital broadcasting when said mode switching portion sets said digital mode.

14. The television apparatus according to claim 12, wherein
    said control portion is so formed as to control such that said display portion preferentially displays an item corresponding to said analog broadcasting than an item corresponding to said digital broadcasting on a screen for setting a function displayed on said display portion when said mode switching portion sets said mixed mode and preferentially displays the item corresponding to said digital broadcasting than the item corresponding to said analog broadcasting on a screen for setting a function displayed on said display portion when said mode switching portion sets said digital mode.

15. The television apparatus according to claim 12, further comprising a remote control having a select button capable of performing selection of said analog broadcasting and said digital broadcasting, wherein
    said control portion is so formed as to control such that said analog broadcasting is preferentially selected in response to operation of said select button of said remote control when said mode switching portion sets said mixed mode and only said digital broadcasting is selected in response to operation of said select button of said remote control when said mode switching portion sets said digital mode.

* * * * *